(12) United States Patent
Katano

(10) Patent No.: US 10,220,723 B2
(45) Date of Patent: Mar. 5, 2019

(54) FUEL CELL VEHICLE

(75) Inventor: Koji Katano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 163 days.

(21) Appl. No.: 14/129,624

(22) PCT Filed: Jun. 26, 2012

(86) PCT No.: PCT/IB2012/001267
§ 371 (c)(1),
(2), (4) Date: Dec. 27, 2013

(87) PCT Pub. No.: WO2013/001341
PCT Pub. Date: Jan. 3, 2013

(65) Prior Publication Data
US 2014/0113161 A1 Apr. 24, 2014

(30) Foreign Application Priority Data
Jun. 30, 2011 (JP) ................................. 2011-146104

(51) Int. Cl.
*H01M 8/00* (2016.01)
*B60L 11/18* (2006.01)
(Continued)

(52) U.S. Cl.
CPC ........... *B60L 11/1887* (2013.01); *B60L 1/003* (2013.01); *B60L 1/02* (2013.01); *B60L 2210/40* (2013.01);
(Continued)

(58) Field of Classification Search
CPC .. H01M 2250/20; H01M 6/50; H01M 6/5038; H01M 10/60; H01M 10/61;
(Continued)

(56) References Cited

U.S. PATENT DOCUMENTS

2002/0038732 A1* 4/2002 Sugiura ............... B60L 11/1881
180/65.28
2003/0062204 A1 4/2003 Kato et al.
(Continued)

FOREIGN PATENT DOCUMENTS

DE 102007024567 A1 11/2008
DE 102008033483 A1 2/2009
(Continued)

*Primary Examiner* — Nicholas P D'Aniello
(74) *Attorney, Agent, or Firm* — Hunton Andrews Kurth LLP

(57) ABSTRACT

A fuel cell vehicle (1) includes: a fuel cell (11); a storage battery (17); a power control unit (10), electrically connected to the fuel cell (11) and the storage battery (17), for controlling electric power in the vehicle (1); a power distribution unit (16), provided on an electrical path between the storage battery (17) and the power control unit, for distributing the electric power from the storage battery; and power-generation auxiliary machines (15) which are electrically connected to the power distribution unit (16) and to which the electric power, distributed by the power distribution unit (16), is supplied for performing operation for electric power generation by the fuel cell (11). The power distribution unit (16) and the power control unit (10) are connected directly without use of a harness.

14 Claims, 7 Drawing Sheets

(51) Int. Cl.
  *B60L 1/00* (2006.01)
  *B60L 1/02* (2006.01)
(52) U.S. Cl.
  CPC ....... *B60L 2240/34* (2013.01); *B60L 2240/36* (2013.01); *Y02T 10/7241* (2013.01); *Y02T 90/34* (2013.01)
(58) Field of Classification Search
  CPC ...... H01M 10/62; H01M 10/63; H01M 10/64; B60L 11/1887; B60L 1/003; B60L 1/02; B60L 2240/34; B60L 2210/40; B60L 2240/36; Y02T 90/34; Y02T 10/7241
  See application file for complete search history.

(56) References Cited

U.S. PATENT DOCUMENTS

| | | | |
|---|---|---|---|
| 2004/0106027 A1* | 6/2004 | Imaseki et al. | 429/26 |
| 2005/0032404 A1 | 2/2005 | Furuta et al. | |
| 2006/0102398 A1 | 5/2006 | Mizuno | |
| 2009/0023306 A1* | 1/2009 | Korich et al. | 439/34 |
| 2009/0088915 A1* | 4/2009 | Kizaki | 701/22 |
| 2009/0183936 A1* | 7/2009 | Kim et al. | 180/68.4 |
| 2009/0256420 A1 | 10/2009 | Takehara et al. | |
| 2010/0231038 A1* | 9/2010 | Sugimura et al. | 307/9.1 |

FOREIGN PATENT DOCUMENTS

| | | |
|---|---|---|
| JP | 01-143231 U1 | 10/1989 |
| JP | 09-277840 A | 10/1997 |
| JP | 2002118981 A | 4/2002 |
| JP | 2003-182379 A | 7/2003 |
| JP | 2004-127747 A | 4/2004 |
| JP | 2005-059680 A | 3/2005 |
| JP | 2006131146 A | 5/2006 |
| WO | 2007/132935 A1 | 11/2007 |

* cited by examiner

FUEL CELL VEHICLE

CROSS REFERENCE TO RELATED APPLICATION

This is a national phase application based on the PCT International Patent Application No. PCT/IB2012/001267 filed on Jun. 26, 2012, claiming priority to Japanese application No. 2011-146104 filed Jun. 30, 2011, the entire contents of both of which are incorporated herein by reference.

BACKGROUND OF THE INVENTION

1. Field of the Invention

The invention relates to a fuel cell vehicle in which a fuel cell that generates electric power by electrochemical reaction is mounted.

2. Description of the Related Art

A fuel cell vehicle uses a fuel cell, which generates electric power by electrochemical reaction between fuel gas and oxidant gas, as a power source. Today, efforts are underway to put a fuel cell vehicle into practical use as a vehicle that does not use petroleum-based fuel.

On the other hand, a hybrid vehicle that uses both electricity and petroleum-based fuel is already in practical use. A fuel cell vehicle is advantageous over a hybrid vehicle in that the fuel cell vehicle does not use fuel oil at all.

SUMMARY OF THE INVENTION

In putting a fuel cell vehicle into practical use, one idea is to apply the configuration of a hybrid vehicle's electric system to a fuel cell vehicle for maximum productivity and minimum costs.

However, a fuel cell vehicle requires not only a fuel cell but also power-generation auxiliary machines, such as a hydrogen pump, a coolant pump, and an electric heater, for use when the fuel cell generates electric power. This means that the application of the configuration of the hybrid vehicle's electric system to a fuel cell vehicle requires that those power-generation auxiliary machines be electrically connected to a power control unit of the vehicle as additional machines. The power control unit controls the electric power from a battery that is a power source of the vehicle.

When harnesses are used to connect the power-generation auxiliary machines to the power control unit, many high-voltage harnesses are required. Each of those high-voltage harnesses requires a protector for ensuring safety against a collision as well as space for installation in the vehicle. This requirement results in an increase in the vehicle weight and in the cost.

The invention provides a fuel cell vehicle that employs a hybrid vehicle's electric system configuration and that prevents an increase in the number of high-voltage harnesses.

An aspect of the invention relates to a fuel cell vehicle that includes: a storage battery; a power control unit that is electrically connected at least to a fuel cell and the storage battery, and that controls electric power in the vehicle; a power distribution unit that is provided on an electrical path between the storage battery and the power control unit, and that distributes electric power from the storage battery; and a plurality of power-generation auxiliary machines which are electrically connected to the power distribution unit, to which the electric power, distributed by the power distribution unit, is supplied, and which operate for electric power generation by the fuel cell.

According to the aspect of the invention, because the power distribution unit is provided on the electrical path between the storage battery and the power control unit and the electric power, distributed by the power distribution unit, is supplied to the plurality of power-generation auxiliary machines for the fuel cell, the configuration of an electric system of a hybrid vehicle, in which a storage battery and a power control unit are electrically connected to each other, may be applied. In addition, because the electric power distributed by the power distribution unit is supplied to each of the auxiliary machines, an increase in the number of high-voltage harnesses is prevented. The use of the storage battery as an electric power source of the auxiliary machines allows electric power to be supplied to the auxiliary machines with the voltage adjusted to the auxiliary machines.

The power distribution unit and the power control unit in the fuel cell vehicle may be connected directly to each other without use of a harness.

The power distribution unit and the power control unit may be provided with a connector for directly connecting and fixing the power distribution unit and the power control unit to each other, and the connector may be provided on a rear face of the power control unit.

A plurality of holding parts that hold together the power distribution unit and the power control unit may be provided, and the plurality of holding parts may be designed such that a strength of a holding part far from the connector is lower than a strength of a holding part near the connector.

The power distribution unit may have an L-shape when viewed from top, and may be formed along one side face and the rear face of the power control unit.

A front face of the power distribution unit may be positioned behind a front face of the power control unit.

A harness that electrically connects the power distribution unit and the storage battery to each other may be provided, and the harness may be connected to a top face of the power distribution unit.

A tilting part may be formed on a top face of a case of the power distribution unit. A socket, into which a terminal of the harness is fit and fixed, may be formed on the tilting part. An insertion opening, into which a tool for fastening the terminal of the harness and a connection terminal of the power distribution unit together within the case is inserted, may be formed on a side face of the case, the side face being located on a side where a height of the tilting part is large.

The plurality of power-generation auxiliary machines may include an electric heater provided in a position lower than the power distribution unit.

The power distribution unit and the power control unit may be arranged next to each other in a lateral direction of the vehicle. The electric heater may be arranged behind the power distribution unit. The harness extending from the power distribution unit to the electric heater may be drawn from a side face of the power distribution unit, the side face being on an opposite side of the power distribution unit from the power control unit.

The fuel cell vehicle may further include a holding member that holds together the power distribution unit and the power-generation auxiliary machines.

According to the aspect of the invention, the configuration of the electric system of a hybrid vehicle may be applied and, because this configuration prevents an increase in the number of high-voltage harnesses, the cost is significantly reduced while the productivity of vehicles is increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF THE EMBODIMENTS

Figure 1:
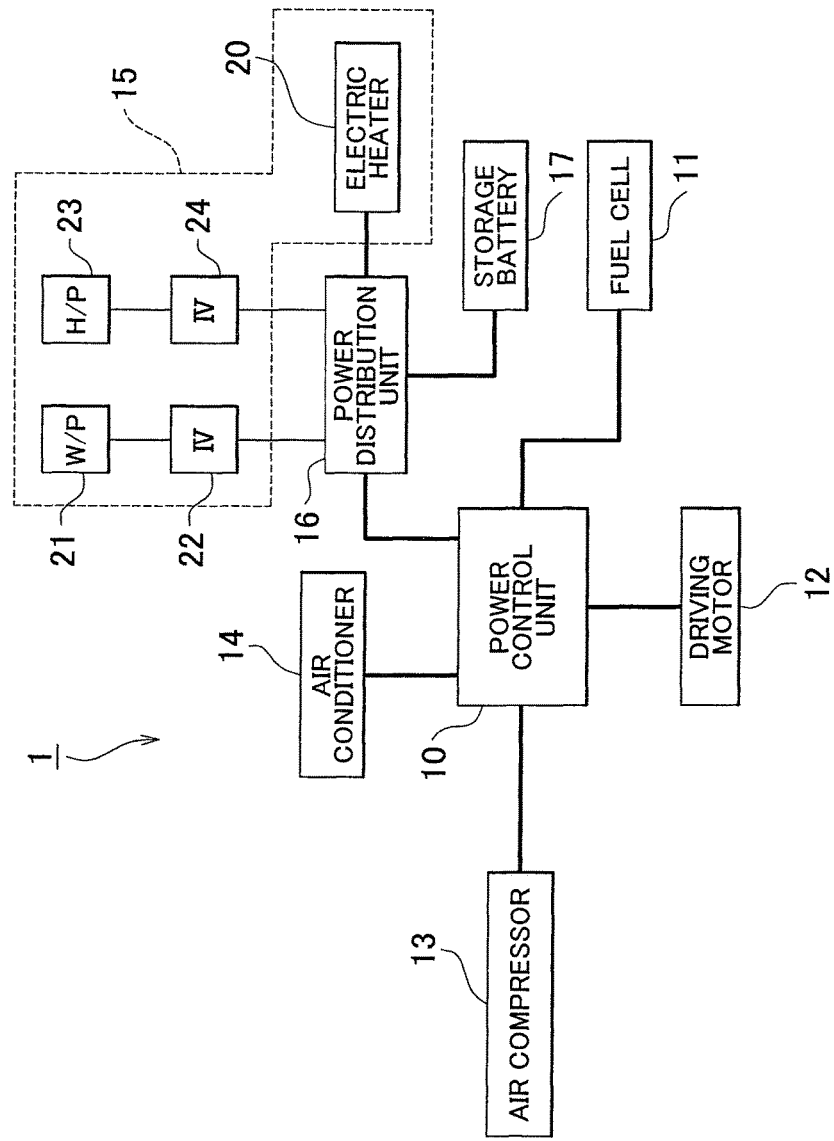
FIG. 1 is a diagram schematically showing the general configuration of an electrical system of a fuel cell vehicle.

An example embodiment of the invention will be described below with reference to the accompanying drawings. FIG. 1 is a diagram schematically showing the configuration of an electric system of a fuel cell vehicle 1 according to the present embodiment.

In the fuel cell vehicle 1, the following are electrically connected to a power control unit (PCU) 10: a fuel cell (FC) 11, a driving motor 12 that drives front wheels, an air compressor 13 that supplies oxygen to the fuel cell 11 when the fuel cell 11 generates electric power, an air conditioner 14 for air-conditioning of a vehicle compartment, multiple power-generation auxiliary machines 15 that work when the fuel cell 11 generates electric power, a power distribution unit 16, and a storage battery 17.

The power control unit 10 controls the electric power in the vehicle 1. The power control unit 10 supplies the electric power generated by the fuel cell 11 or the electric power stored in the storage battery 17 to the units that require electric power such as the driving motor 12, or stores the electric power, generated by the fuel cell 11, in the storage battery 17.

The storage battery 17 is connected to the power control unit 10 via the power distribution unit 16. The power-generation auxiliary machines 15 are electrically connected to the power distribution unit 16. For example, an electric heater 20 for heating the fuel cell 11, and inverters for pumps for the fuel cell 11, more specifically, an inverter 22 for a coolant pump 21 and an inverter 24 for a hydrogen pump 23, are electrically connected to the power distribution unit 16. Therefore, the electric power stored in the storage battery 17 is supplied to the power-generation auxiliary machines 15 via the power distribution unit 16. The coolant pump 21 is provided to cool the fuel cell 11, and the hydrogen pump 23 is provided to supply hydrogen gas used as fuel gas to the fuel cell 11.

Figure 2:
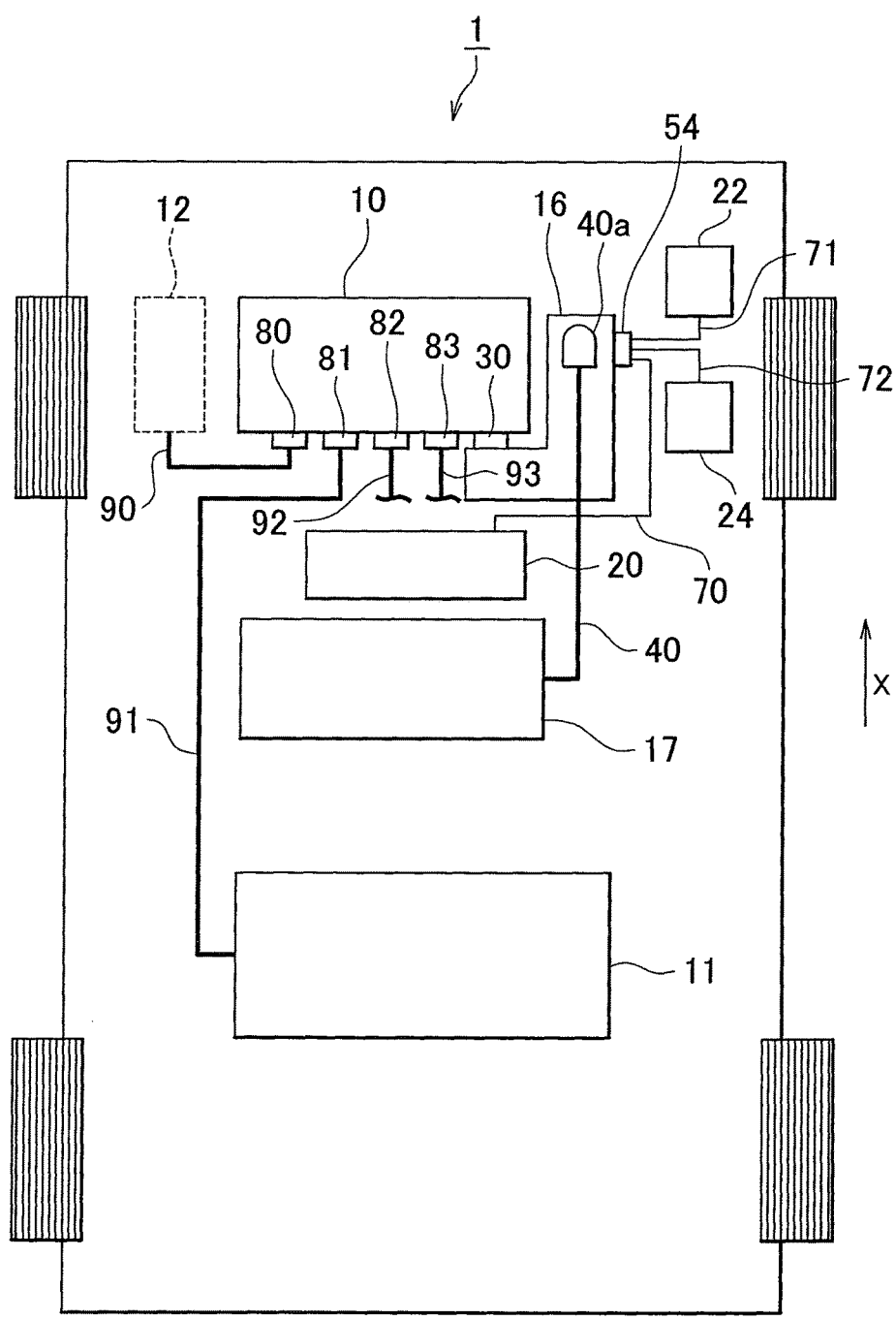
FIG. 2 is diagram schematically showing an example of the arrangement of units in the vehicle.
Figure 3:
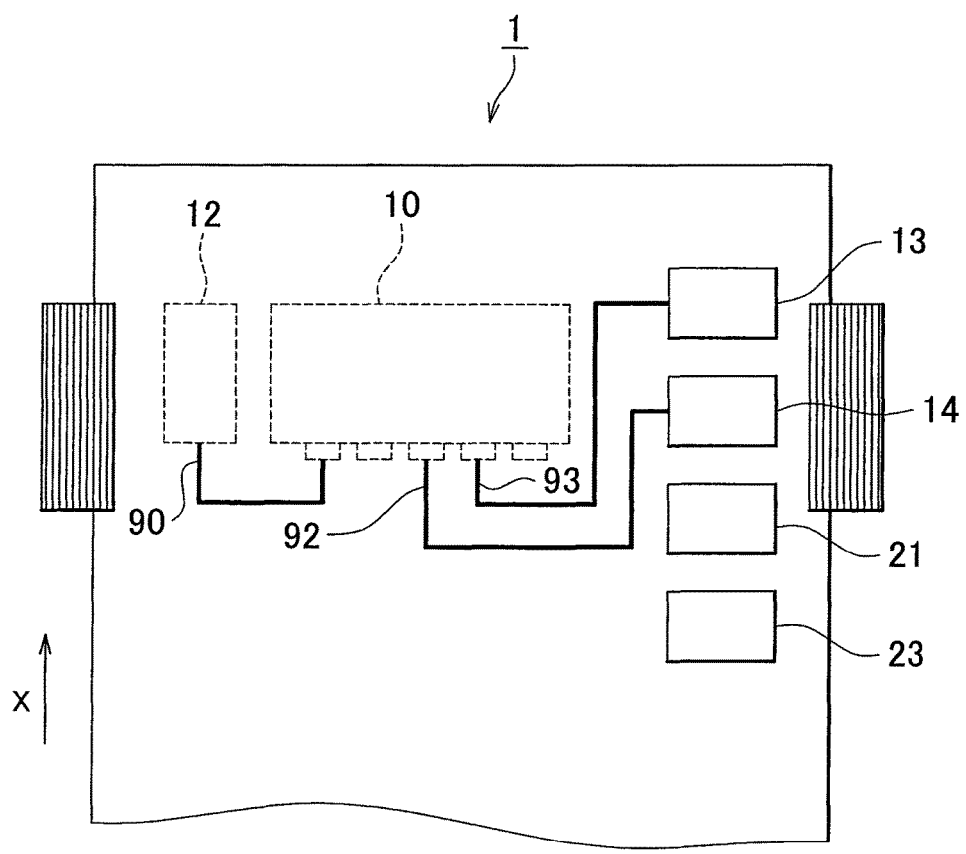
FIG. 3 is diagram schematically showing an example of the arrangement of units on a lower side within the vehicle.

FIG. 2 and FIG. 3 show an example of the installation of the electric system in the fuel cell vehicle 1. The power control unit 10, which is rectangular in shape, is provided at the center of the front of the vehicle 1. As shown in FIG. 2, the power distribution unit 16 is arranged on one side (right side in FIG. 2) of the power control unit 10. The electric heater 20, the storage battery 17, and the fuel cell 11 are arranged behind the power control unit 10 (the X direction in FIG. 2 indicates the direction toward the front of the vehicle). The inverters 22, 24 are arranged on the right side of the power distribution unit 16. The driving motor 12, the air compressor 13, the air conditioner 14, the coolant pump 21, and the hydrogen pump 23 are arranged on the lower side of the power control unit 10. As shown in FIG. 3, the driving motor 12 is arranged on the left side of the power control unit 10. The air compressor 13, the air conditioner 14, the coolant pump 21, and the hydrogen pump 23 are arranged on the right side of the power control unit 10.

Figure 4:
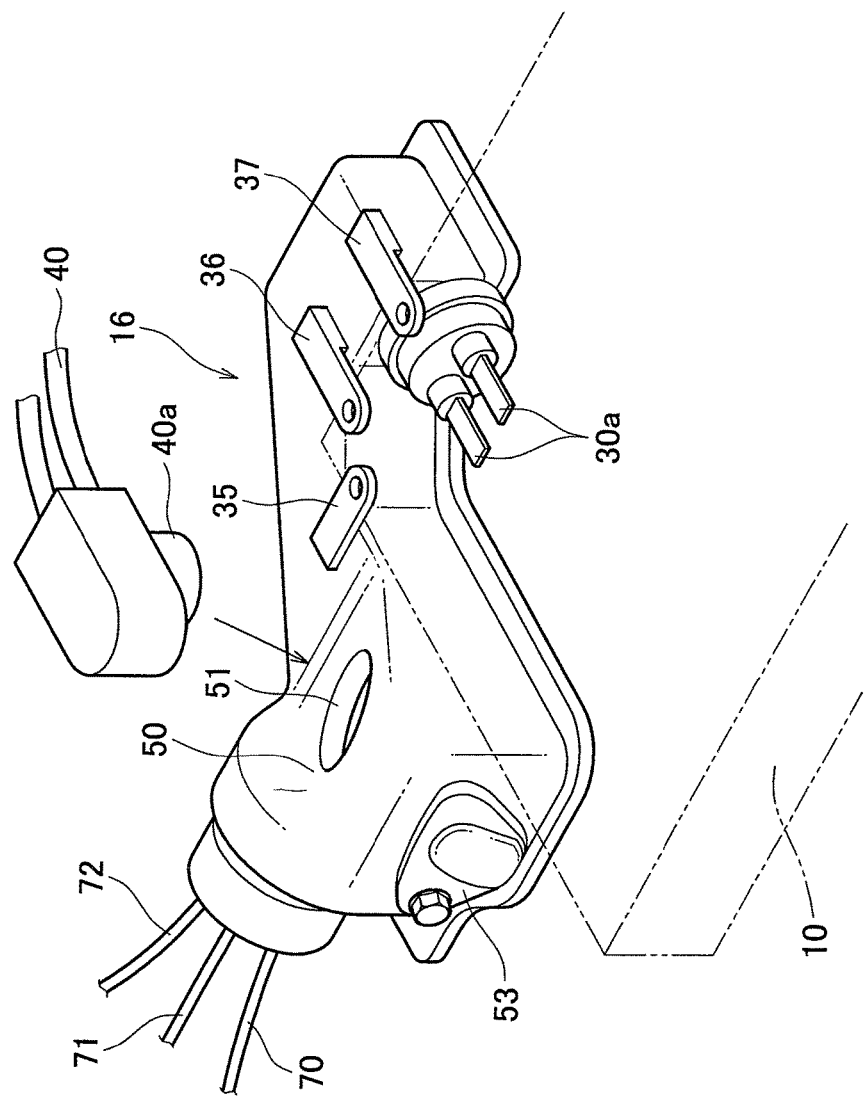
FIG. 4 is a perspective view showing the general configuration of a power distribution unit.

As shown in FIG. 2, the power distribution unit 16 is connected not via a harness but directly to the power control unit 10. More specifically, the power distribution unit 16, which has an L-shape when viewed from top as shown in FIG. 2 and FIG. 4, is formed along one side face (right side face) and the rear face of the power control unit 10. A connector 30 is provided on the rear face of the power control unit 10 to directly connect the power distribution unit 16 and the power control unit 10 to each other. The connector 30 is composed of a port (not shown) on the power control unit 10 and a plug terminal 30a on the power distribution unit 16. Therefore, inserting the plug terminal 30a on the power distribution unit 16 into the port on the power control unit 10 causes the power control unit 10 and the power distribution unit 16 to be fastened to each other to establish electrical connection.

The power distribution unit 16 has multiple (for example, three) holding parts 35, 36, and 37 for fastening the power distribution unit 16 and the power control unit 10 together, as shown in FIG. 4. Each of the holding parts 35, 36, and 37 is configured, for example, of a plate member with a through-hole. The power distribution unit 16 and the power control unit 10 are fastened together with the bolts that are fitted via the through-holes on the holding parts 35, 36, and 37 into holes on the power control unit 10.

The power distribution unit 16 is secured in such a position that the front face of the power distribution unit 16 is behind the front face of the power control unit 10, as shown in FIG. 2.

Figure 5:
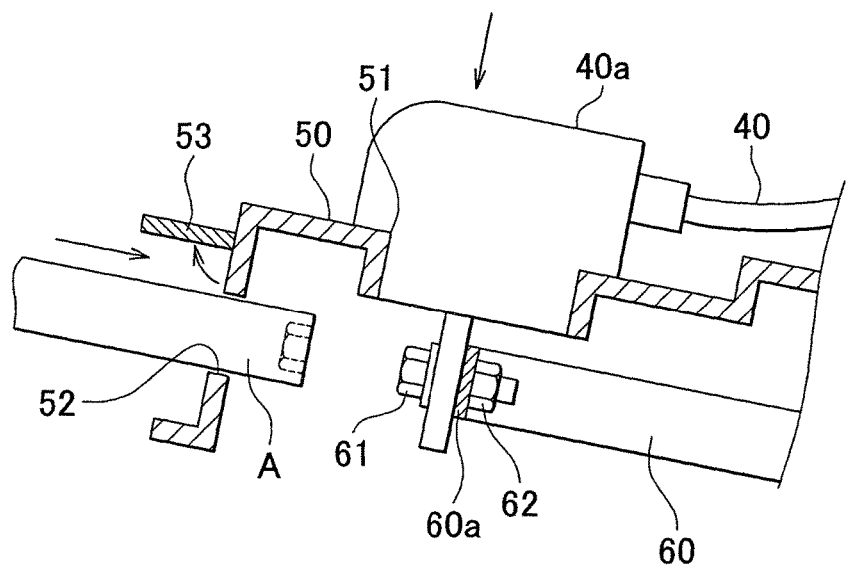
FIG. 5 is a sectional view showing the configuration of the top of a case of the power distribution unit.

A harness 40 leading to the storage battery 17 is connected on the top face of a longer side part of the power distribution unit 16 (a part along the right side face of the power control unit 10). As shown in FIG. 4 and FIG. 5, a tilting surface 50 is formed on the top face of a case of the power distribution unit 16 as a tilting part. A socket 51, into which a terminal 40a of the harness 40 is snap-fit, is formed on the tilting surface 50. An insertion opening 52, into which a tool A is inserted, is formed on the side face (front face) of the case of the power distribution unit 16. The side face, on which the insertion opening 52 is formed, is located on the side where the height of the tilting surface 50 is large. Normally, a lid 53 is provided on the insertion opening 52, and the tool A can be inserted into the insertion opening 52 by opening the lid 53. The tool A is used to fasten together the terminal 40a of the harness 40 and a connection terminal 60a of a harness 60 provided in the power distribution unit 16, within the case of the power distribution unit 16.

The terminal 40a of the harness 40 has a ring-shaped O terminal at the tip. The terminal 40a of the harness 40 can be electrically connected to the connection terminal 60a of the harness 60 by passing a bolt 61 into the O terminal and securing the connection terminal 60a of the harness 60 onto the O terminal with a nut 62. Note that the terminal 40a of the harness 40 and the harness 60 are supported by the case of the power distribution unit 16.

A connection terminal 54 is provided on the opposite side (right side) of the power distribution unit 16 from the power control unit 10, as shown in FIG. 2. Harnesses 70, 71, and 72 leading respectively to the electric heater 20 and the inverters 22, 24 are connected to the connection terminal 54.

Connection terminals 80, 81, 82, and 83 are provided on the rear face of the power control unit 10. Harnesses 90, 91, 92, and 93 leading to the driving motor 12, the fuel cell 11, the air conditioner 14, and the air compressor 13 are connected respectively to the connection terminals 80, 81, 82, and 83. The connection terminals 80 to 83 are provided in a row beside the connector 30 of the power distribution unit 16.

Figure 6:
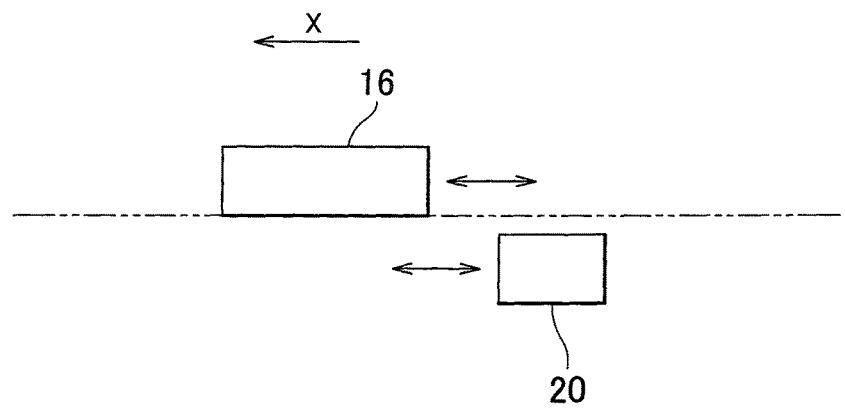
FIG. 6 is diagram showing the positional relation between the power distribution unit and an electric heater in the height direction.

The electric heater 20, provided behind the power control unit 10 and the power distribution unit 16, is set in a position lower than the position of the power distribution unit 16 as shown in FIG. 6 so that the electric heater 20 and the power distribution unit 16 do not overlap in the vertical direction with each other. This arrangement prevents a collision between the power distribution unit 16 and the electric heater 20 even if these devices move in the horizontal direction.

In the present embodiment, the power distribution unit 16 is provided on the electrical path between the storage battery 17 and the power control unit 10, and the electric power, which is distributed by the power distribution unit 16, is supplied to the power-generation auxiliary machines 15 for the fuel cell 11. This means that the configuration of the hybrid vehicle's electrical system, in which a storage battery and a power control unit are electrically connected, may be applied in the present embodiment. In addition, the power distribution unit 16 provided in the present embodiment supplies electric power to the power-generation auxiliary machines 15, preventing an increase in the number of high-voltage harnesses. Using the storage battery 17 as the power source of the power-generation auxiliary machines 15 allows electric power to be supplied to the auxiliary machines with the voltage adjusted to each auxiliary machine.

In the present embodiment, the power distribution unit 16 and the power control unit 10 are connected directly to each other without use of a harness. This configuration eliminates the need for a mechanism such as an interlock for detecting a harness disconnection that might be detected when a harness is used, thus reducing the cost. In addition, this configuration does not take up space for harnesses, making the electrical system compact.

The power distribution unit 16 and the power control unit 10 are provided with the connector 30 for direct connection and fixation. The connector 30 is provided on the rear face of the power control unit 10 to minimize damage to the connector 30 that would be caused in the event of a collision of the vehicle 1. This configuration also reduces damage to the connector 30 in which high-voltage flows, thus increasing safety.

In addition, the power distribution unit 16, which has an L-shape when viewed from top, is formed along one side face and the rear face of the power control unit 10. This arrangement allows the power control unit 10 and the power distribution unit 16 to be assembled into one compact unit.

The configuration, in which the front of the power distribution unit 16 is arranged behind the front of the power control unit 10, prevents a collision impact from being directly applied to the power distribution unit 16 in the event of a collision of the vehicle 1 and therefore protects the power distribution unit 16. In general, the power control unit 10 is reinforced against a collision with the result that the power distribution unit 16 is also protected by the reinforcement. Therefore, this reinforcement eliminates the need for an additional reinforcement for the power distribution unit 16, reducing the weight and the cost of the vehicle 1.

Because the power distribution unit 16 and the storage battery 17 are connected to each other via the harness 40 that is connected on the top face of the power distribution unit 16, the connection part of the high-voltage harness 40 is protected in the event of a collision of the vehicle 1. As compared to the case where the harness 40 is otherwise connected to the power distribution unit 16, the connection described above enables a worker to access the connection part more easily and therefore increases the efficiency in manufacturing or assembling the vehicle 1.

The tilting surface 50 is formed on the top face of the case of the power distribution unit 16. The socket 51, into which the terminal 40$a$ of the harness 40 is snap-fit, is formed on the tilting surface 50. The insertion opening 52 is formed on the side face located on the side where the height of the tilting surface 50 of the case is large. The tool A is allowed to be inserted into the insertion opening 52 to fasten, within the case, together the terminal 40$a$ of the harness 40 and the connection terminal 60$a$ of the harness 60, which is in the power distribution unit 16. This structure allows the tool A to be inserted easily from the obliquely upper side without interfering with members (for example, an upper radiator support) usually provided in front of the power distribution unit 16. This structure also eliminates the need for raising the position of connection between the terminal 40$a$ of the harness 40 and the connection terminal 60$a$ of the harness 60 to a position high enough for the tool to be inserted horizontally with no interference with the members provided in front of the power distribution unit 16, thereby keeping the power distribution unit 16 low-profile. As a result, this structure contributes to pedestrian protection and vehicle's low center of gravity.

The power-generation auxiliary machines 15 include the electric heater 20, which is provided lower than the power distribution unit 16. Therefore, a collision between the electric heater 20 and the power distribution unit 16 is prevented even if the electric heater 20 and the power distribution unit 16 move in the event of a collision of the vehicle 1. The structure, in which the electric heater 20 is provided in a lower position, prevents air from accumulating in the electric heater 20 and ensures proper heater operation.

The power distribution unit 16 and the power control unit 10 are arranged next to each other in the lateral direction of the vehicle 1. The electric heater 20 is arranged behind the power distribution unit 16 and the power control unit 10. The harness 70, extending from the power distribution unit 16 to the electric heater 20, is drawn from the connection terminal 54 on the opposite side of the power distribution unit 16 from the power control unit 10. This arrangement prevents damage to the output part of the harness 70 in the event of a collision of the vehicle 1. An appropriate distance between the power distribution unit 16 and the electric heater 20 allows proper connection of the harness 70. The configuration, in which the electric heater 20 is arranged behind the power distribution unit 16, prevents a collision impact from being directly applied to the electric heater 20 to prevent damage to the electric heater 20 in the event of a collision of the vehicle 1. Therefore, this arrangement increases the safety of the vehicle.

Figure 7:
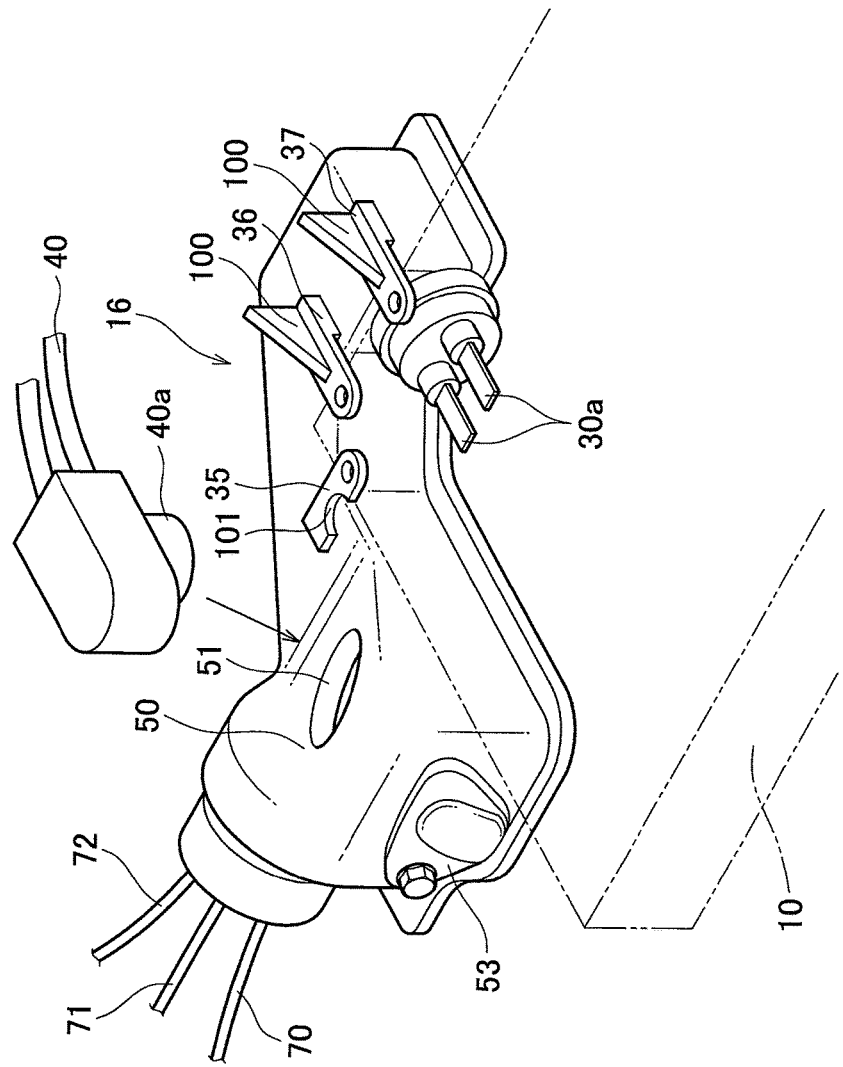
FIG. 7 is a perspective view showing the general configuration of a power distribution unit having holding parts with ribs and a holding part with an indentation.

The holding parts 35 to 37, which hold together the power distribution unit 16 and the power control unit 10 in the present embodiment, may be designed such that the strength of the holding part 35, farther from the connector 30 than the holding parts 36, 37 as shown in FIG. 7, is lower than the strength of the holding parts 36, 37. For example, ribs 100 are formed on the plates of the holding parts 36, 37, and an indentation 101 is formed on the plate of the holding part 35. With the holding parts 35 to 37 designed in this way, the holding part 35 farther from the connector 30 is broken first in the event of a collision of the vehicle 1. Therefore, the power distribution unit 16 is deformed at a portion near the holding part 35 and the collision energy is absorbed in this portion with the result that the connector 30, through which the high-voltage electrical current flows, is protected. Means for varying the strength between a holding part near the connector 30 and a holding part far from the connector 30 may be changed as necessary. For example, the number of holding parts near the connector 30 and the number of holding parts far from the connector 30 may be different from each other. Alternatively, holding parts near the connector 30 and holding parts far from the connector 30 may be different in shape or material.

Figure 8:
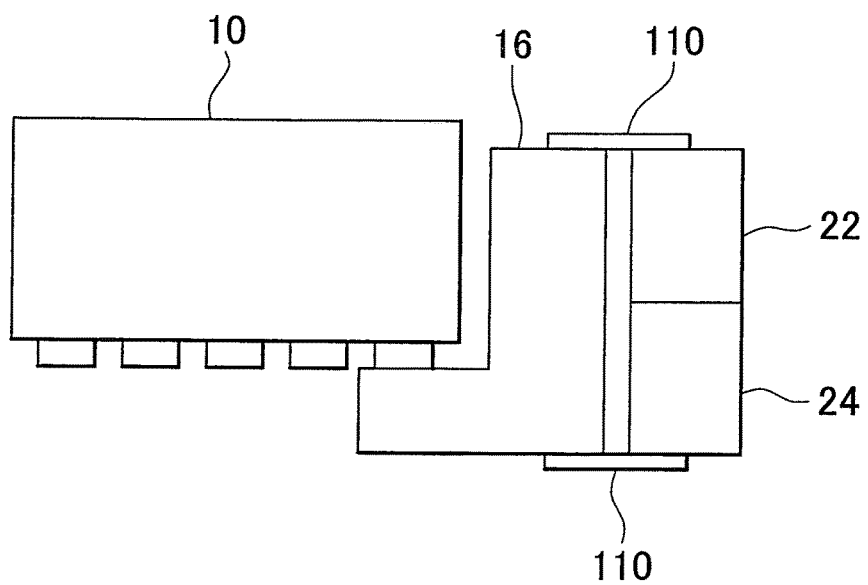
FIG. 8 is diagram showing an example of the connection between a power control unit and power-generation auxiliary machines held together by holding members.

In the embodiment described above, the power distribution unit 16 and the power-generation auxiliary machines 15 (for example, inverters 22, 24), which are the power supply destination, may be held together by holding members 110, as shown in FIG. 8. The holding members 110, extending from the power distribution unit 16 to the inverters 22, 24, are connected to the power distribution unit 16 and to the inverter 22, 24, respectively. This structure minimizes the relative displacement between the power distribution unit 16 and the power-generation auxiliary machines 15 in the event of a collision of the vehicle 1, preventing a collision between the power distribution unit 16 and the power-generation auxiliary machines 15. Some of the power-generation auxiliary machines 15 and the power distribution unit 16 may be held together as in the present embodiment or all of the power-generation auxiliary machines 15 and the power distribution unit 16 may be held together.

While the example embodiment of the invention has been described with reference to the drawings, the invention is not limited to the example given above For example, although the power control unit is electrically connected to the storage battery and the fuel cell as well as to the air conditioner, the driving motor, and the air compressor in the embodiment described above, the power control unit may also be connected to other units in the vehicle. The other units may include some of the power-generation auxiliary machines that operate during power generation such as an air compressor. Although the power-generation auxiliary machines connected to the power distribution unit are the electric heater and the hydrogen pump provided with the inverter and the coolant pump provided with the inverter in the embodiment described above, the type and the number of power-generation auxiliary machines may also be changed. In addition, although the power control unit and the power distribution unit are connected directly to each other in the embodiment described above, the invention is applicable also when the power control unit and the power distribution unit are connected to each other via a harness.

The invention claimed is:

1. A fuel cell vehicle in which a fuel cell that generates electric power by electrochemical reaction is mounted, comprising:
a storage battery;
a power control unit that is electrically connected at least to the fuel cell and the storage battery, and that controls electric power in the vehicle;
a power distribution unit that is provided on an electrical path between the storage battery and the power control unit, and that distributes electric power from the storage battery, wherein the power distribution unit is provided separately from the power control unit and the power distribution unit and the power control unit are connected directly to each other, and the power distribution unit is provided with a connection terminal to which a harness directed to the storage battery is connected, and a plurality of connection terminals to which a plurality of harnesses is respectively connected, each of the plurality of harnesses being directed to respective one of a plurality of auxiliary machines, and the power distribution unit is configured to allow electric power to be supplied by the power distribution unit with voltage adjusted to each auxiliary machine; and
a plurality of power-generation auxiliary machines which are electrically connected to the power distribution unit, and which operate for electric power generation by the fuel cell, wherein the power distribution unit is configured to directly supply said electric power from the storage battery to the plurality of power generation auxiliary machines, wherein
the power distribution unit and the power control unit are connected directly to each other without use of a harness; and
the power distribution unit and the power control unit are provided with a connector for directly connecting and fixing the power distribution unit and the power control unit to each other.

2. The fuel cell vehicle according to claim 1, wherein the connector is provided on a rear face of the power control unit.

3. The fuel cell vehicle according to claim 2, further comprising:
a plurality of holding parts that hold together the power distribution unit and the power control unit, the plurality of holding parts designed such that a strength of a holding part far from the connector is lower than a strength of a holding part near the connector.

4. The fuel cell vehicle according to claim 3, wherein the holding part near the connector has a reinforcing rib.

5. The fuel cell vehicle according to claim 3, wherein holding part far from the connector has an indentation.

6. The fuel cell vehicle according to claim 1, wherein the power distribution unit has an L-shape when viewed from top and is formed along one side face and the rear face of the power control unit.

7. The fuel cell vehicle according to claim 6, wherein a front face of the power distribution unit is positioned behind a front face of the power control unit.

8. The fuel cell vehicle according to claim 6, wherein a driving motor is arranged on an opposite side of the power control unit from the power distribution unit.

9. The fuel cell vehicle according to claim 1, further comprising:
a harness that electrically connects the power distribution unit and the storage battery to each other, wherein the harness is connected to a top face of the power distribution unit.

10. The fuel cell vehicle according to claim 9, wherein:
a tilting part is formed on a top face of a case of the power distribution unit;
a socket, into which a terminal of the harness is fit and fixed, is formed on the tilting part; and an insertion opening, into which a tool for fastening the terminal of the harness and a connection terminal of the power distribution unit together within the case is inserted, is formed on a side face of the case, the side face being located on a side where a height of the tilting part is greater than a height of the tilting part without the insertion opening.

11. The fuel cell vehicle according to claim 1, wherein the plurality of power-generation auxiliary machines include an electric heater provided in a position lower than the power distribution unit.

12. The fuel cell vehicle according to claim 11, wherein
the power distribution unit and the power control unit are arranged next to each other in a lateral direction of the vehicle;
the electric heater is arranged behind the power distribution unit or the power control unit; and
a harness extending from the power distribution unit to the electric heater is drawn from a side face of the power distribution unit, the side face being on an opposite side of the power distribution unit from the power control unit.

13. The fuel cell vehicle according to claim 11, wherein the plurality of power-generation auxiliary machines include a coolant pump and a hydrogen pump.

14. The fuel cell vehicle according to claim 1, further comprising:
a holding member that holds together the power distribution unit and the power-generation auxiliary machines.

* * * * *